(12) United States Patent
Cross

(10) Patent No.: US 9,638,463 B2
(45) Date of Patent: May 2, 2017

(54) SEPARATELY CONTROLLABLE AIR CIRCULATION DRYING SYSTEM

(71) Applicant: Eddie Cross, Inwood, NY (US)

(72) Inventor: Eddie Cross, Inwood, NY (US)

(*) Notice: Subject to any disclaimer, the term of this patent is extended or adjusted under 35 U.S.C. 154(b) by 0 days.

(21) Appl. No.: 14/709,737

(22) Filed: May 12, 2015

(65) Prior Publication Data

US 2015/0241122 A1    Aug. 27, 2015

Related U.S. Application Data

(60) Provisional application No. 62/018,982, filed on Jun. 30, 2014.

(51) Int. Cl.
| | |
|---|---|
| *F26B 3/04* | (2006.01) |
| *F26B 21/00* | (2006.01) |
| *F26B 9/02* | (2006.01) |
| *F24H 3/04* | (2006.01) |
| *F24H 9/20* | (2006.01) |
| *F24D 19/10* | (2006.01) |
| *G05D 23/19* | (2006.01) |

(52) U.S. Cl.
CPC ............ *F26B 3/04* (2013.01); *F24D 19/1084* (2013.01); *F24H 3/0411* (2013.01); *F24H 9/2071* (2013.01); *F26B 9/02* (2013.01); *F26B 21/004* (2013.01); *G05D 23/1905* (2013.01)

(58) Field of Classification Search
CPC ...... F26B 3/00; F26B 3/04; F26B 9/02; F26B 19/00; F26B 21/00; F26B 21/04; B01D 35/00; B01D 35/14; A47K 10/00; A47K 10/48; F24D 5/00; F24D 5/02; F24D 19/1084; E04B 5/00; E04B 5/48; F24H 3/0411; F24H 9/2071
USPC ......... 34/90, 202, 218; 454/187; 4/598, 599; 392/384, 385
See application file for complete search history.

(56) References Cited

U.S. PATENT DOCUMENTS

| | | | |
|---|---|---|---|
| 3,157,105 A | 11/1964 | Tamm et al. | |
| 5,269,071 A | 12/1993 | Hamabe et al. | |
| 5,839,879 A | 11/1998 | Kameoka et al. | |
| 6,148,539 A * | 11/2000 | Hatfield | A47K 10/48 34/223 |
| 6,927,686 B2 * | 8/2005 | Nieters | G08C 17/00 340/539.17 |

(Continued)

*Primary Examiner* — Stephen M Gravini
(74) *Attorney, Agent, or Firm* — Global Intellectual Property Agency, LLC; Daniel Boudwin

(57) ABSTRACT

An air circulation system adapted to dry floors that is segregated and separately controllable from the building's HVAC system. The system includes an air duct having an inlet and an outlet, a fan, and a heater. The inlet is adapted to drawn air in from either the surrounding environment or is connectable to the building's existing air circulation ductwork. The system is designed so that the outlet is positionable adjacently to a floor surface when the system is installed in a wall or to the exterior surface of a wall, thereby allowing the fan to blow air directly over the surface of the floor, increasing the efficiency with which the floor is dried. The present system further comprises a wireless transceiver for wirelessly controlling the functionality of the present system and various other activation mechanisms for separately controlling the fan and the heater without requiring direct user input.

14 Claims, 4 Drawing Sheets

(56) References Cited

U.S. PATENT DOCUMENTS

| | | | | |
|---|---|---|---|---|
| 7,213,349 B1* | 5/2007 | Brunner | ............... | D06F 58/20 |
| | | | | 34/86 |
| 7,243,050 B2* | 7/2007 | Armstrong | ............ | G08B 21/20 |
| | | | | 702/182 |
| 7,971,369 B2 | 7/2011 | Studebaker | | |
| 8,006,407 B2* | 8/2011 | Anderson | ............ | F26B 21/001 |
| | | | | 110/224 |
| 8,038,075 B1* | 10/2011 | Walsh | ............... | F24F 13/1426 |
| | | | | 165/217 |
| 8,112,899 B1 | 2/2012 | Duckworth | | |
| 8,202,146 B1 | 6/2012 | Johnson et al. | | |
| 8,438,753 B2* | 5/2013 | Martin | ............... | A47K 3/281 |
| | | | | 236/94 |
| 8,640,360 B2* | 2/2014 | Stamm | ............... | F24F 3/1405 |
| | | | | 236/44 A |
| 8,702,482 B2* | 4/2014 | Helt | ............... | F24F 11/0001 |
| | | | | 236/49.3 |
| 2015/0241122 A1* | 8/2015 | Cross | ............... | F26B 3/04 |
| | | | | 34/218 |

* cited by examiner

SEPARATELY CONTROLLABLE AIR CIRCULATION DRYING SYSTEM

CROSS REFERENCE TO RELATED APPLICATION

This application claims the benefit of U.S. Provisional Application No. 62/018,982 filed on Jun. 30, 2014. The above identified patent application is herein incorporated by reference in its entirety to provide continuity of disclosure.

FIELD OF THE INVENTION

The present invention relates to drying devices. More specifically, the present invention relates to self-contained, permanently-installed drying units that utilize a fan and a heater, are adapted to increase the efficiency of drying floors, and are segregated and/or separately controlled from the building's pre-existing HVAC system.

BACKGROUND OF THE INVENTION

It often takes a substantial amount of time for sections of floor having a large surface area to dry after becoming wet, especially with sections of floor having a substantial amount of foot traffic. Fans or portable heaters can be temporarily set up to assist in drying the wet area of floor; however, they lack the ability to output enough heated air to substantially affect the rate at which the floor dries. To attempt to address these issues, the building's heat can be turned up and in some cases the rate of airflow of the building's HVAC system can be increased, but those attempted fixes affect the entire building or area of the building, which can make individuals in the building uncomfortable. Therefore, there is a need in the prior art for a self-contained air movement system that is segregated or separately controllable from the building's HVAC system and that comprises an outlet that is positionable adjacently to a floor surface when the system is installed within the building.

SUMMARY OF THE INVENTION

In view of the foregoing disadvantages inherent in the known types of air circulation or movement systems now present in the prior art, the present invention provides a segregated floor drying system that is separately controllable from the rest of the building's HVAC system, wherein the same can be utilized for providing convenience for the user when seeking to efficiently dry expanses of a wet floor without making the building or surrounding area of the building uncomfortable for occupants. The present system comprises an air duct having an inlet and an outlet, a fan, and a heater. The inlet is adapted to drawn air in either from the surrounding environment or is connectable to the building's existing air circulation ductwork. The present invention is adapted to serve as an air circulation and drying system that is separately controllable from a building's existing HVAC system. Furthermore, the outlet is designed so that it is positionable adjacently to a floor surface when the system is installed in a wall or to the exterior surface of a wall, thereby allowing the fan to blow air over the surface of the floor, increasing the efficiency with which the floor is dried. The present system further comprises a wireless transceiver for wirelessly controlling the functionality of the present system and various other activation mechanisms for separately controlling the fan and the heater without requiring direct user input.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
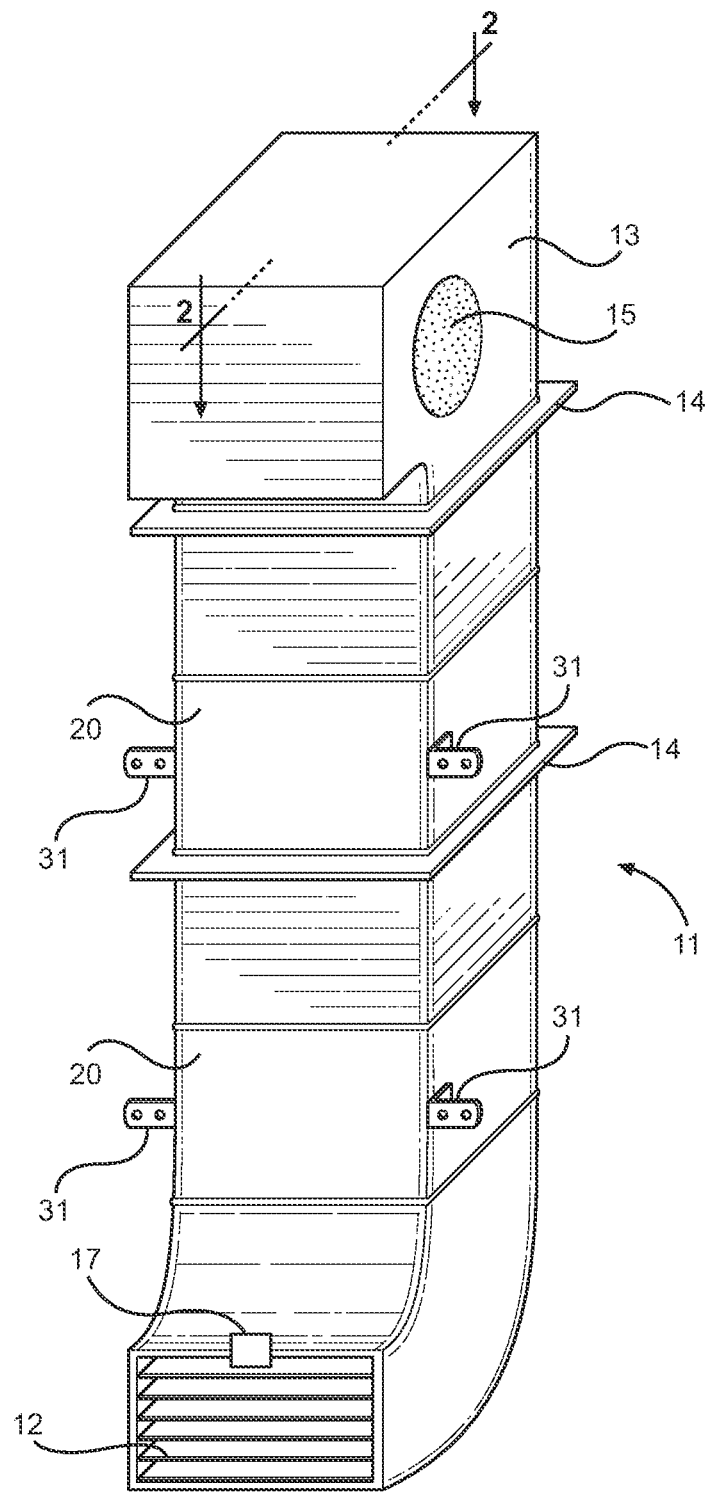
FIG. 1 shows a perspective view of the present invention.

Reference is made herein to the attached drawings. Like reference numerals are used throughout the drawings to depict like or similar elements of the drying system. For the purposes of presenting a brief and clear description of the present invention, the preferred embodiment will be discussed as used for drying wet floors utilizing a permanently-installed system that is installable into a building's existing duct work. The figures are intended for representative purposes only and should not be considered to be limiting in any respect.

The present invention is an air circulation and drying unit that is adapted to blow heated air across a floor and that is separately controllable from the building's pre-existing HVAC system. The present system can be installed such that it is completely segregated from the building's pre-existing HVAC system or it can be installed such that it draws air from the building's existing air circulation ductwork. In either case, the present system provides its own integrated heater and fan, thereby allowing the present floor drying system to be activated separately from the building's pre-existing HVAC system. This allows operators to increase the efficiency with which wet floors are dried by using heated air, without the need to increase the airflow rate and/or heat throughout the entire building.

Figure 2:
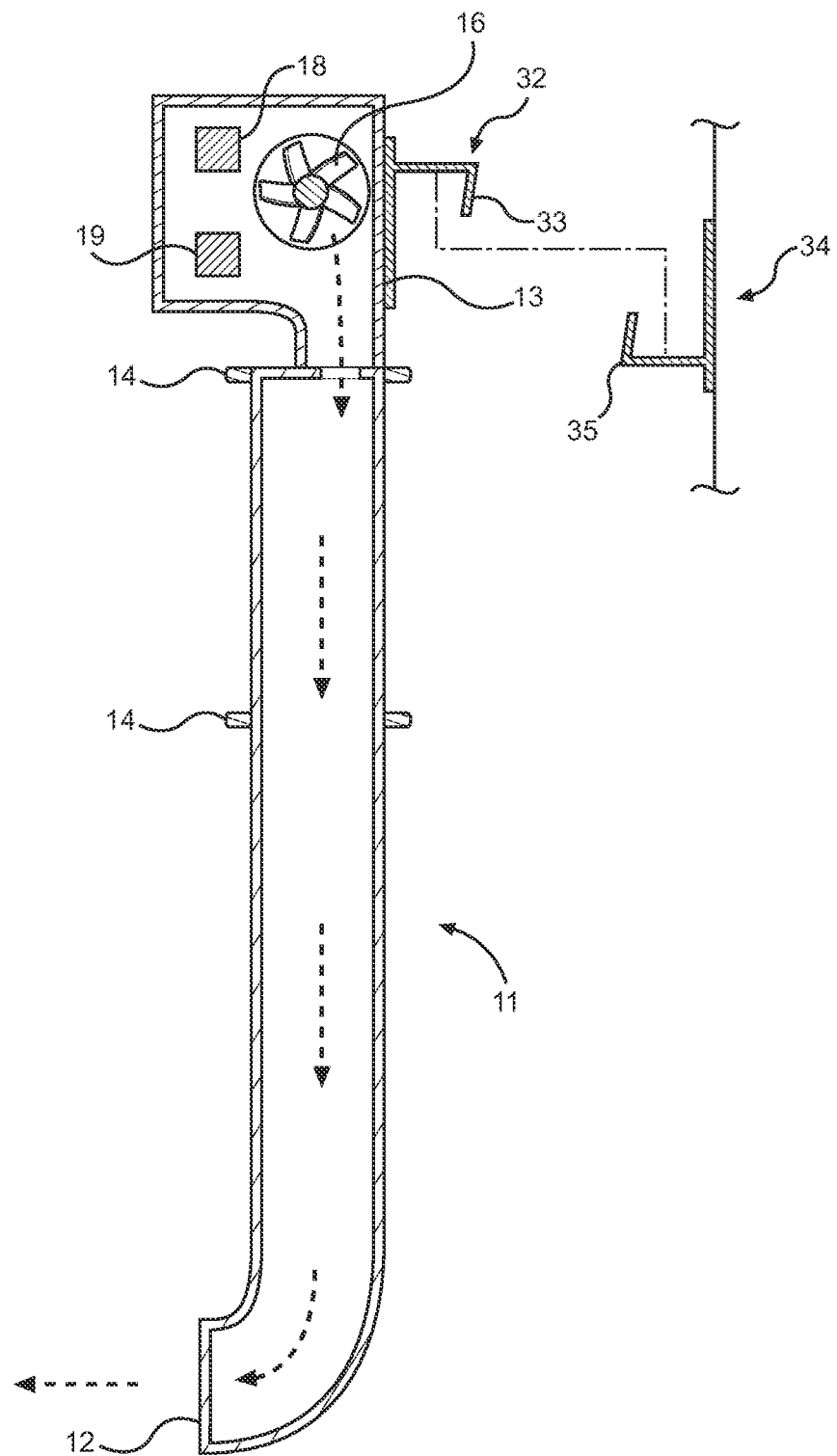
FIG. 2 shows a cross-sectional view of the present invention along line 2-2.

Referring now to FIGS. 1 and 2, there are shown various views of the present invention. The present invention comprises a duct 11 having an inlet 15, an outlet 12, and a plenum housing 13 containing a fan 16 and a heater 18. The present invention is designed so that the outlet 12, or vent, is positioned adjacently to a floor when the system is installed, allowing air expelled from the outlet 12 to be blown across the surface of the floor and in order to speed up the process of drying a wet floor. The present invention is adapted to serve as a permanent fixture of a building that is activatable at will by users. The present system can be installed within a wall or mounted to a wall or another such surface.

The duct 11 is an elongated conduit having a continuous fluid passageway extending between an inlet 15 disposed at the upper end of the duct 11 and an outlet 12 disposed at the lower end of the duct 11. In an illustrative embodiment of the present invention, air is drawn in through the inlet 15 into the plenum housing 13 via a fan 16 disposed within the housing and then expelled by the fan 16 through the duct 11, out of the outlet 12. The plenum housing 13 further comprises a heater 18 disposed therein, which heats air as it is drawn into the plenum housing 13, prior to being expelled through the duct 11. In one embodiment of the present invention, the inlet 15 is positioned so that air is drawn into the present system from the surrounding environment, whereupon it is heated and then subsequently expelled. In another embodiment of the present invention, the building's existing air ductwork is connectable to the inlet 15 via any conventional means known in the prior art, allowing the present invention to draw air from the building's existing air circulation system.

The present invention further comprises a wireless transceiver 19 to which an electronic device, such as a cell phone, is connectable. The wireless transceiver 19 utilizes any wireless connection protocol known in the prior art, such as Bluetooth or WiFi. The wireless transceiver 19 allows users to control the present system without requiring direct, physical interaction with the system. The wireless transceiver 19 allows users to control a variety of functions associated with the operation of the system, such as, but not limited to, activating or deactivating the fan, activating or deactivating the heater, and setting the rate of rotation of the fan.

The present system is adapted to be modular and adaptable to a variety of different building configurations. The duct 11 is divided into a plurality of separable sections 20 secured together at the flanges 14 extending from the edges of the sections 20. The depicted embodiment of the present invention shows the duct 11 comprising two sections 20; however, any number of sections 20 can be secured together in order to alter the length of the duct 11 and allow the present invention to be customized for each particular building configuration.

The present invention further comprises one or more activation devices to provide additional functionality to the present system. The activation devices comprise any device, software, or hardware known in the prior art that is adapted to control the activation and deactivation of other devices, such as a heater or a fan, via the occurrence of a detectable variable. In an illustrative embodiment of the present invention, the activation devices comprise a motion sensor 17 disposed on the duct 11. In the depicted embodiment of the present invention, the motion sensor 17 is disposed adjacently to the outlet 12. The motion sensor 17 is in electrical communication with the heater 18, the fan 16, and other such components of the present system in order to control the activation and deactivation thereof. The motion sensor 17 is adapted to be programmable by a user. For example, the motion sensor 17 can be programmed to activate the heater 18 and the fan 16 when the motion sensor detects movement, i.e. foot traffic. Users can activate the motion sensor 17 on days having precipitation, thereby causing the system to automatically activate and initiate the drying of the floor any time foot traffic, which is likely bringing in water and making the floor slippery, is detected. This obviates the need for operators to manually activate and deactivate the system, thereby ensuring that the area of the floor towards which the present system is oriented remains dry at all times. In another illustrative embodiment of the present invention, the activation devices comprise a timer circuit.

The fan 16, heater 18, wireless transceiver 19, and other such components are in electrical communication with a power source (not shown). The power source comprises a rechargeable battery, an electrical cord connectable to a conventional wall electrical outlet, or any other such power source known in the prior art. The fan 16 comprises a centrifugal fan or any other such fan known in the prior art. The plenum housing 13 encloses all of the various components, segregating them from the surrounding environment and reducing the level of noise generated by the fan 16.

The present invention is alternatively mountable to either the interior surface of a wall or the exterior surface of a wall. When mounted to the interior surface of the wall, the present invention is substantially enclosed by the wall and hidden from view. When mounted to the exterior surface of a wall, the present invention is easier to access for repairs and modifications. An embodiment of the present invention further comprises a plurality of brackets 31 disposed along the front edge of the duct 11 for installing the present invention to the interior surface of a wall. Fasteners can be secured through the brackets 31 to mount the duct 11 to the interior surface of the wall. The brackets 31 are positioned along the front edge of the duct 11 so that the vent 12 is positioned such that extends through a complementary aperture in the wall and feeds into the room when the duct 11 is mounted to the interior surface of a wall.

An embodiment of the present invention further comprises a mounting plate 32 disposed on the rear surface of the plenum housing 13, which is adapted to engage with a receiving plate 34 that is attachable to the exterior surface of a wall by fasteners, adhesive, or any other means known in the prior art. In one embodiment of the present invention, the mounting plate 32 is removably attachable to the rear surface of the plenum housing by any means known in the prior art. In another embodiment of the present invention, the mounting plate 32 is integral to the plenum housing 13. The mounting plate 32 comprises a channel hook 33 extending therefrom and the receiving plate 34 comprises a receiver channel hook 35 extending therefrom. The channel hook 33 is adapted to removably engage with the receiver channel hook 35, suspending the duct 11 from the receiving plate 34 when the receiving plate 34 is mounted to a wall.

Figure 3:
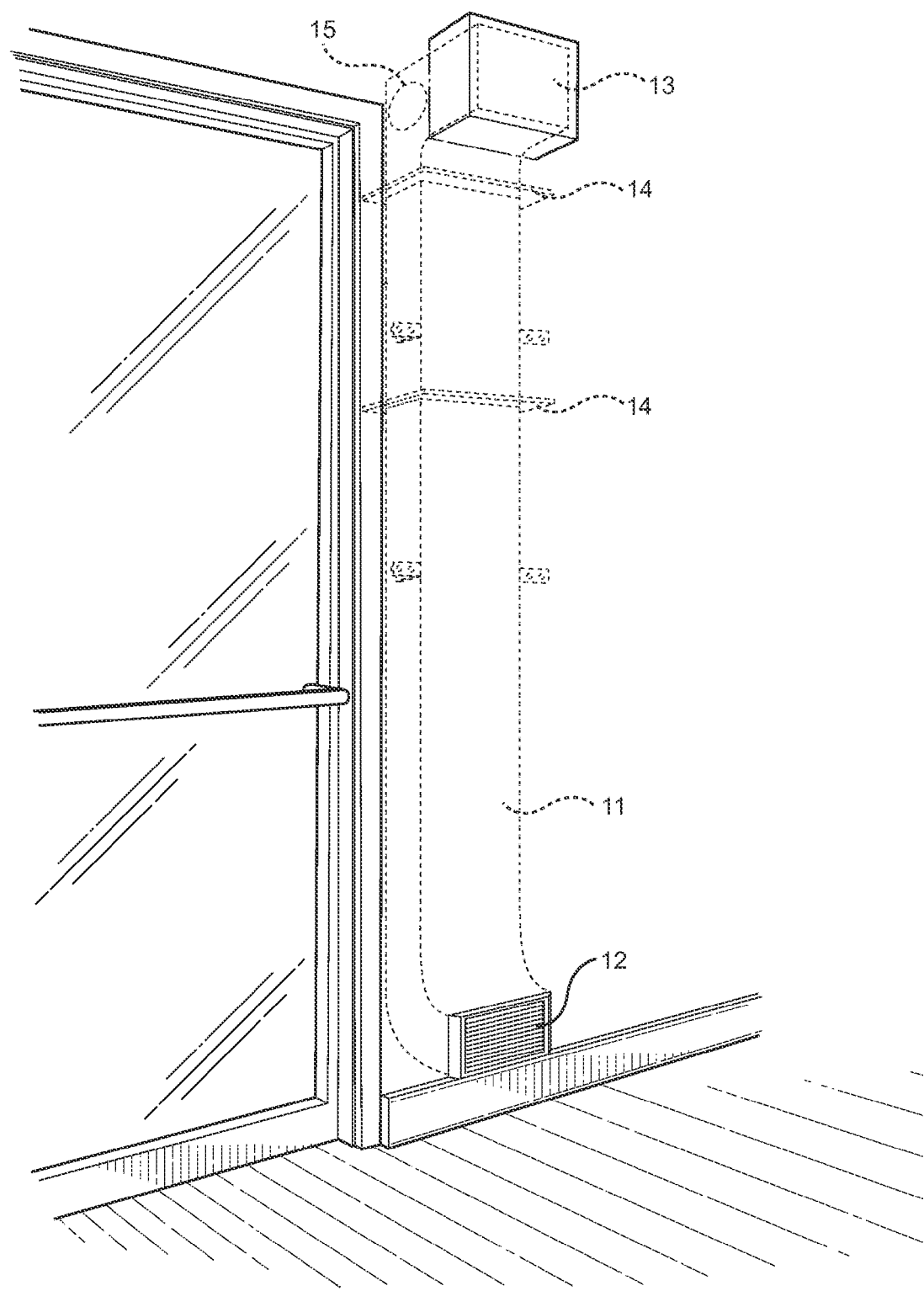
FIG. 3 shows a view of the present invention installed within a wall.

Referring now to FIG. 3, there is shown a view of the present invention mounted to the interior surface of a wall. The present invention is installable within a wall, i.e. mountable to the interior surface of a wall as shown in FIG. 3, or installable outside a wall, i.e. mountable to the exterior surface of a wall. The present invention is mounted to the interior or exterior surface of a wall via fasteners and brackets as are commonly used in the art of ductwork, or any other such means. In an illustrative embodiment of the present invention installed within a wall, the plenum housing 13 extends from the surface of the wall. When the present system is installed, the outlet 12 is positioned adjacently to the floor, thereby allowing the air expelled therefrom to be directly blown across the surface of the floor, increasing the rate at which water thereon dries.

Figure 4:
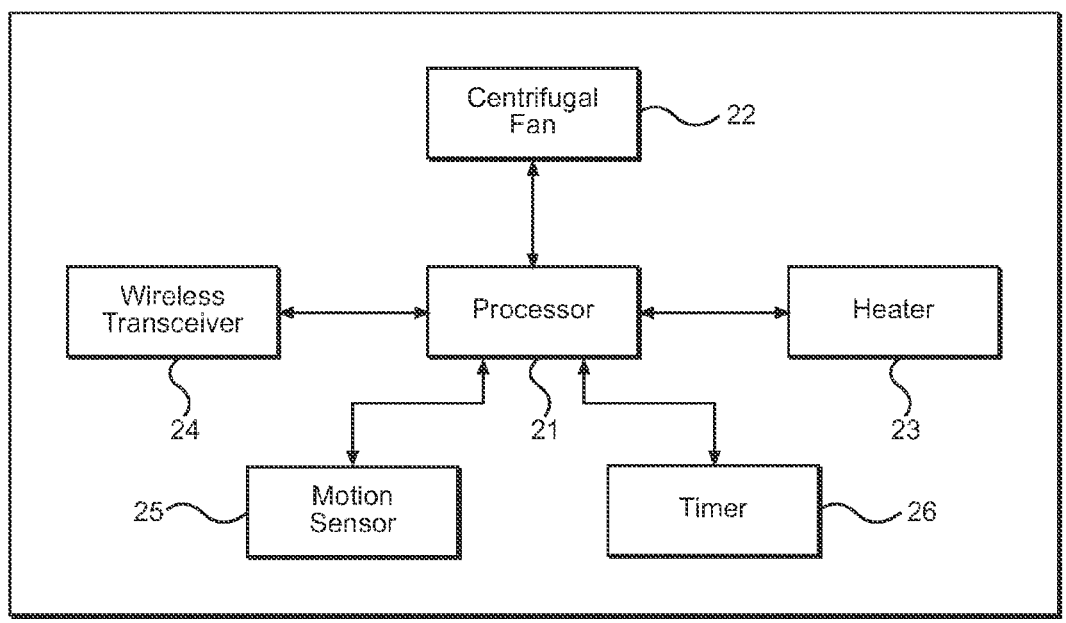
FIG. 4 shows a schematic diagram of the present invention.

Referring now to FIG. 4, there is shown a schematic diagram of the present invention. The present invention comprises a processor 21, which controls the functionality of one or more additional device in communication therewith, including the fan 22, the heater 23, the wireless transceiver 24, the motion sensor 25, and the timer 26. The processor 21 executes instructions stored on a non-transitory computer-readable medium to control the functionality of the fan 22 or the heater 23 in response to input received from the wireless transceiver 24, the motion sensor 25, or the timer 26.

The processor 21 can be programmed, via commands received from an electronic device in communication device in communication with the wireless transceiver 24, to alter the functionality of the fan 22 and the heater 23 in response to inputs received from the wireless transceiver 24, the motion sensor 25, and the timer 26. For example, the timer circuit 26 can be set to activate the fan 22, change the rate of rotation of the fan 22, activate the heater 23, change the level of heater generated by the heater 23, and so on, via the processor 21, at pre-programmed times of day or after pre-programmed lengths of time have elapsed. Likewise, the motion sensor 25 can alter the functionality of the fan 22 and the heater 23 in response to detected motion.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air circulation system adapted to receive air from an external source and supply the air to a room, comprising:
   a plenum housing having a first end;
   an air duct comprising an inlet directly secured to the first end of the plenum housing, an outlet, and a fluid passageway between the inlet and the outlet;
   a heater;
   a fan adapted propel the air through the air duct to the outlet;
   a wireless transceiver in communication with the fan and the heater;
   wherein the wireless transceiver is adapted to receive commands from an electronic device;
   the heater, the fan, and the wireless transceiver disposed within the plenum housing.

2. The air circulation system of claim 1, further comprising an activation device in electrical communication with the fan and the heater.

3. The air circulation system of claim 2, wherein the activation device comprises a motion sensor.

4. The air circulation system of claim 3, wherein the motion sensor is adapted to activate the fan and the heater when motion is detected.

5. The air circulation system of claim 2, wherein the activation device comprises a timer.

6. The air circulation system of claim 1, wherein the air duct comprises a plurality of modular sections.

7. The air circulation system of claim 1, wherein the air duct is constructed from a material, the material comprising sheet metal.

8. The air circulation system of claim 1, wherein the air duct is constructed from a material, the material comprising polyethylene.

9. The air circulation system of claim 1, further comprising one or more brackets disposed on the air duct.

10. The air circulation system of claim 9, wherein the one or more brackets are disposed along a front edge of the air duct.

11. The air circulation system of claim 1, further comprising: a mounting plate disposed on a rear surface of the air duct; a receiving plate attachable to a surface; wherein the mounting plate is securable to the receiving plate.

12. The air circulation system of claim 11, wherein the mounting plate comprises a channel hook, the receiving plate comprises a receiver channel hook, and the channel hook is securable to the receiver channel hook.

13. The air circulation system of claim 1, wherein a pre-existing duct of a building is connectable to the air circulation system.

14. The air circulation system of claim 13, wherein a pre-existing duct of a building is connectable to the plenum housing.

* * * * *